000# United States Patent [19]

Charles et al.

[11] 4,306,674
[45] Dec. 22, 1981

[54] SOLDERING MACHINE FOR SOLDERING RECTILINEAR AND PARALLEL ELEMENTS

[75] Inventors: Jean-Louis Charles, Vernon; Serge Hémon, Antony; Daniel Rosse, Vernon, all of France

[73] Assignee: Societe Europeenne de Propulsion, Puteaux, France

[21] Appl. No.: 96,523

[22] Filed: Nov. 21, 1979

[30] Foreign Application Priority Data

Dec. 7, 1978 [FR] France .................................. 78 34517

[51] Int. Cl.³ .............................................. B23K 3/00
[52] U.S. Cl. ................................. 228/36; 228/44.1 R; 228/46
[58] Field of Search ................... 228/46, 36, 183, 222, 228/44.1 R; 219/107

[56] References Cited

U.S. PATENT DOCUMENTS

| | | | |
|---|---|---|---|
| 1,918,197 | 7/1933 | Sebell | 228/46 X |
| 2,573,594 | 10/1951 | Nofzinger | 228/44.1 X |
| 2,636,104 | 4/1953 | Hutchins | 219/107 |
| 3,762,031 | 10/1973 | Jonason et al. | 228/183 X |
| 4,231,505 | 11/1980 | Shaw et al. | 228/44.1 R X |

Primary Examiner—Howard N. Goldberg
Assistant Examiner—Kenneth J. Ramsey
Attorney, Agent, or Firm—Shenier & O'Connor

[57] ABSTRACT

A soldering machine for soldering continuously metallic, rectilinear and parallel elements, comprising:

a driving device to move forward the elements to be soldered, which elements are disposed in parallel to the forward direction with at least one lower element, at least one higher element disposed on top of the lower element, and one layer of brazing solder interposed between the said elements in the area provided for the welding, a heating station comprising upper and lower heating rollers with incorporated heating means, which rollers, as the elements move forward, respectively roll under the or each lower element and over the or each upper element in the welding area, and a cooling station located downstream of the heating station and comprising lower and upper cooling rollers, which rollers, as the elements move forward, roll respectively under the or each lower element or over the or each upper element, to solidify the solder and to hold the said elements in close contact one against the other while they go through the cooling station.

11 Claims, 11 Drawing Figures

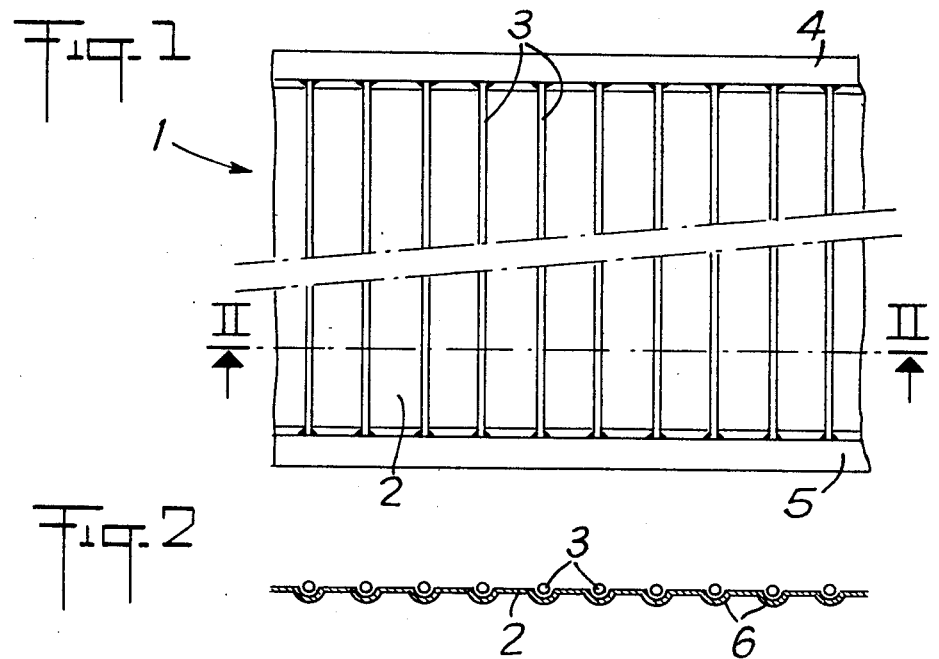
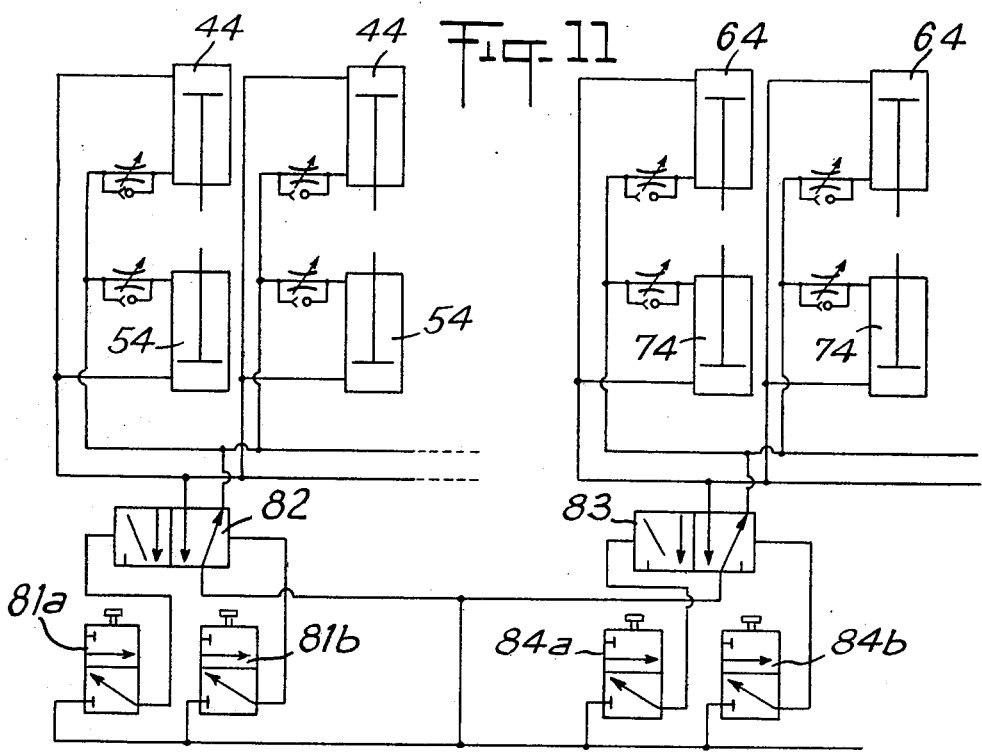

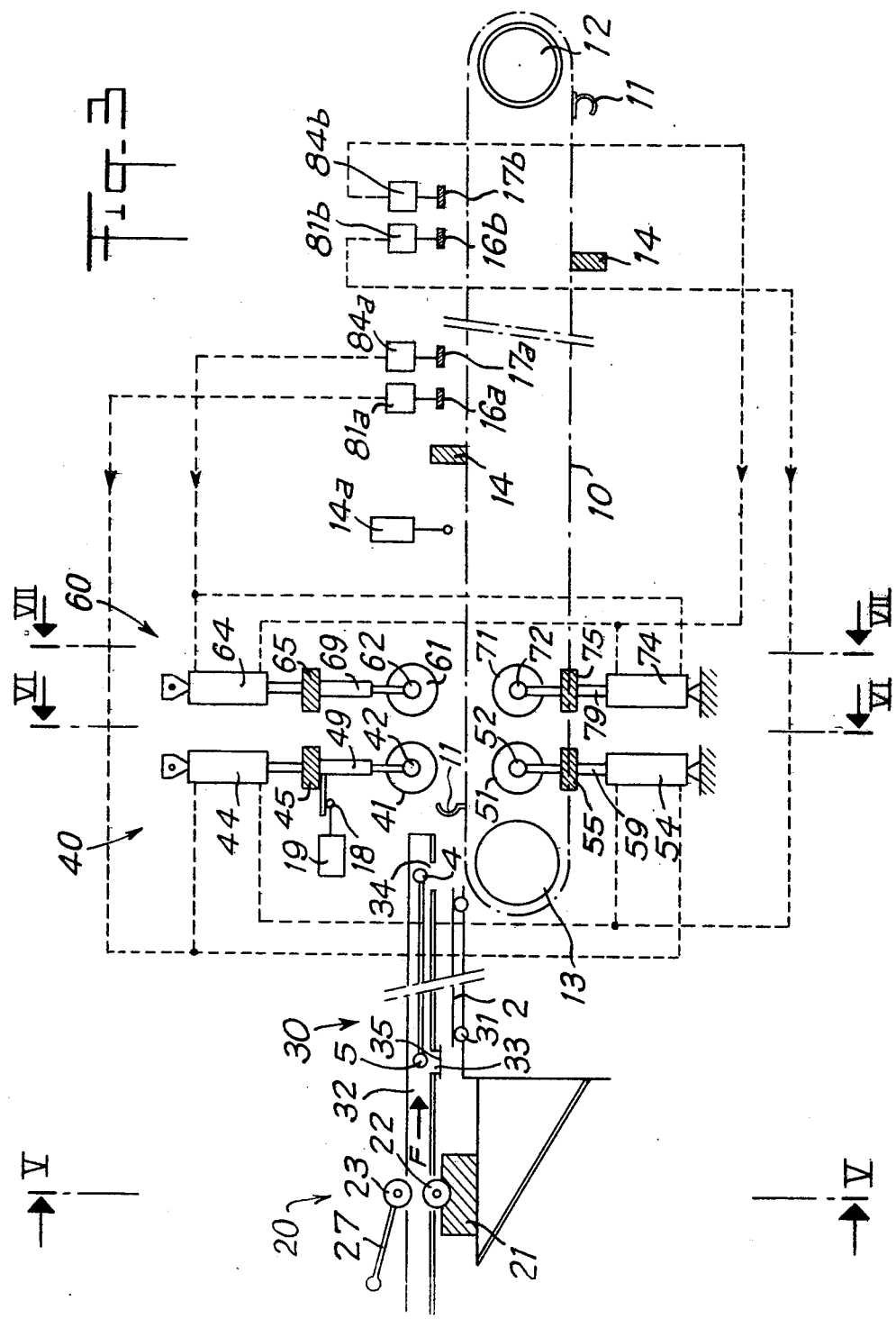

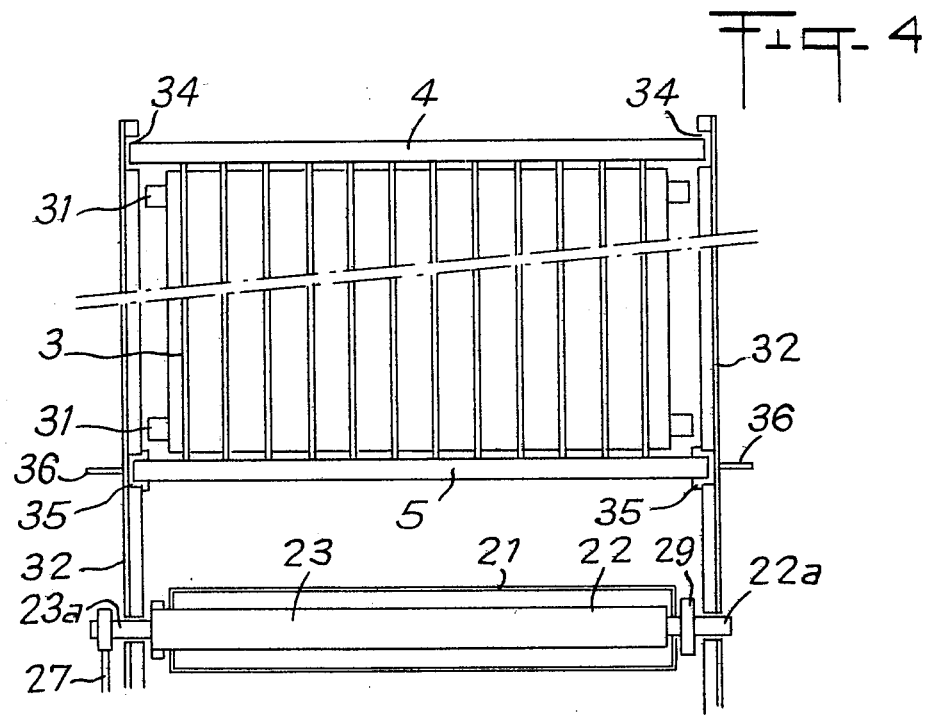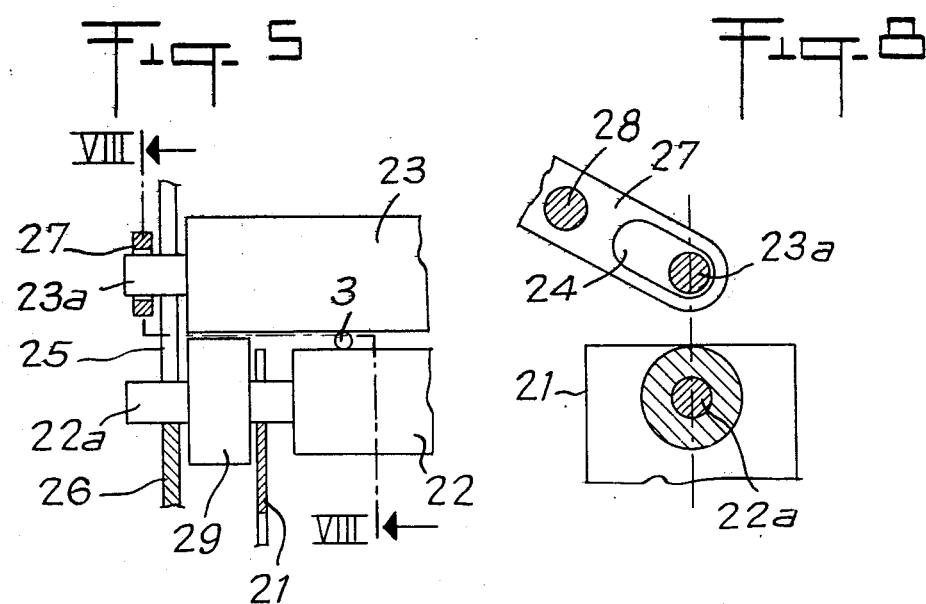

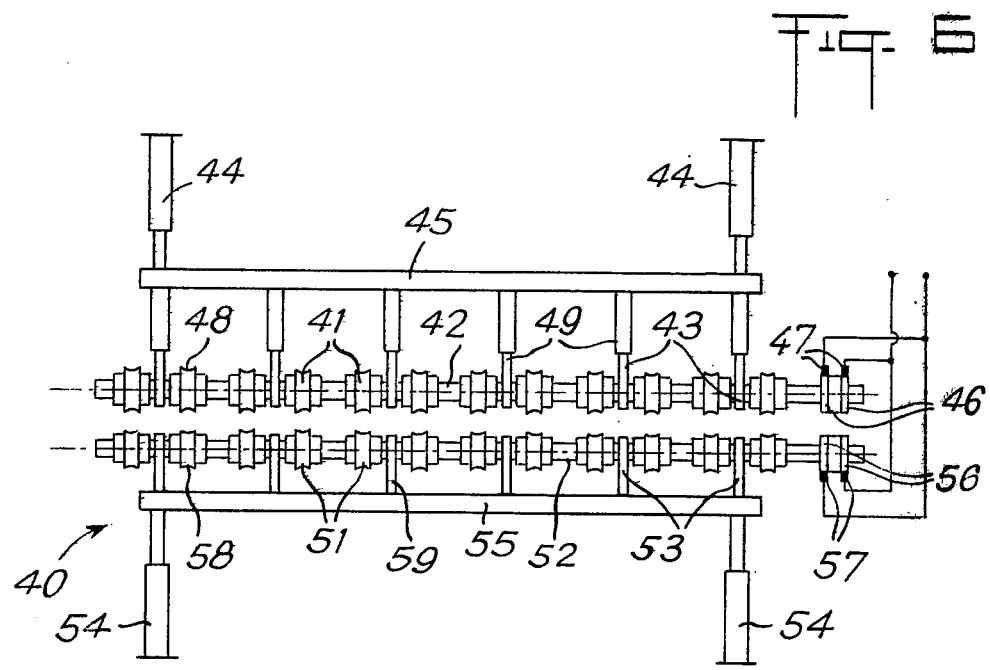
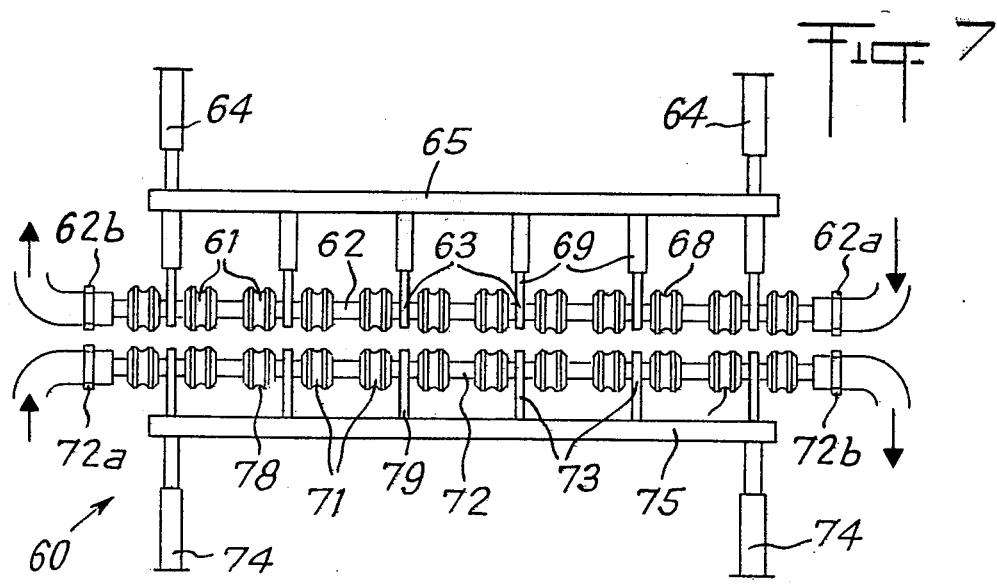

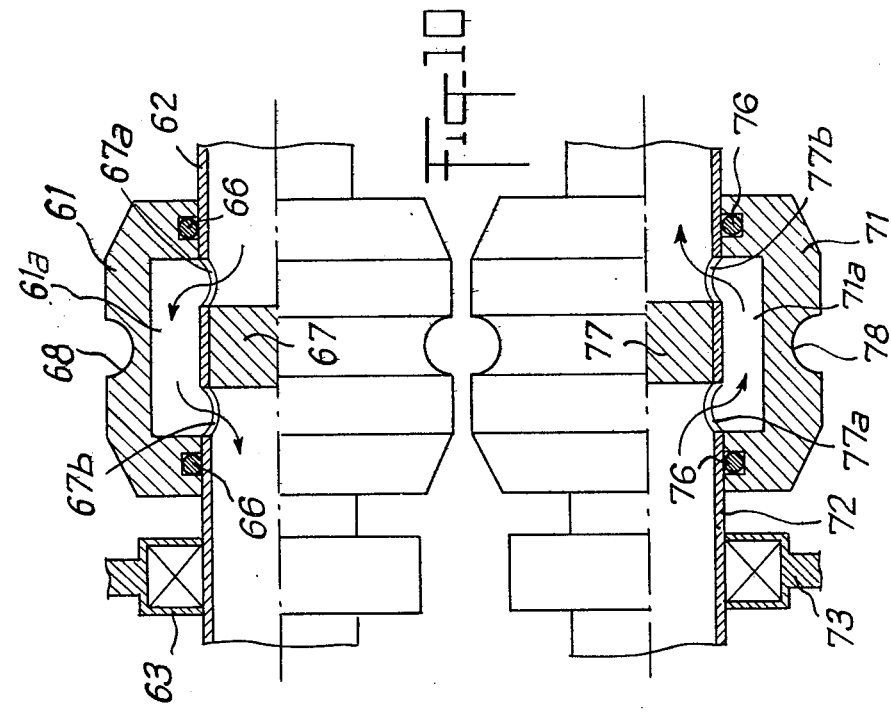
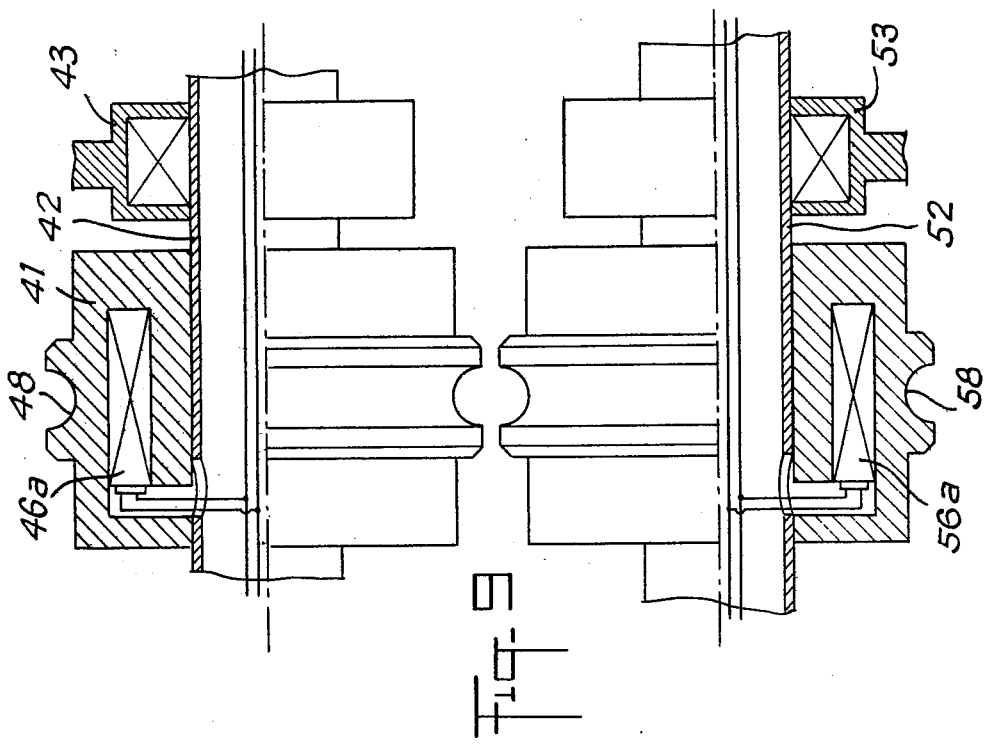

SOLDERING MACHINE FOR SOLDERING RECTILINEAR AND PARALLEL ELEMENTS

The present invention relates to a machine for soldering metallic rectilinear and parallel elements.

One particular field of application of the invention is the soldering of parallel metal pipes on a metal plate, used in particular to produce heat collectors and radiators, such as those used in solar energy collector systems for example. However the invention is not limited to this field of application, and in general it relates to the soldering of parallel rectilinear elements without one of the elements having to be necessarily a plate.

The aim of the present invention is to propose a machine permitting to carry out, automatically, soldering operations which up to now had been done manually, so as to obtain quicker, steadier and more reliable results, without the machine being too expensive to build and to run.

This aim is reached, according to the invention, with a soldering machine comprising, a driving device to move forward the elements to be welded, which elements are disposed in parallel to the forward direction with at least one lower element, at least one higher element disposed on top of the lower element, and one layer of brazing solder interposed between the said elements in the area provided for the soldering, a heating station comprising upper and lower heating rollers with incorporated heating means, which rollers, as the elements move forward, respectively roll under the or each lower element and over the or each upper element in the welding area, and a cooling station located downstream of the heating station and comprising lower and upper cooling rollers, which rollers, as the elements move forward, roll respectively under the or each lower element or over the or each upper element, to solidify the solder and to hold the said elements in close contact one against the other whilst they go through the cooling station.

Thus, a large number of elements can be soldered together in simultaneous and continuous manner, and with similar characteristics which may be adjusted to optimal values by controlling various simple parameters such as for example the temperature of the heating rollers and the forward speed of the plate.

One special feature of the machine according to the present invention, is that it comprises a brazing solder depositing station positioned upstream of the heating station and comprising means for applying the brazing solder, in the area provided for soldering on the or each upper element and/or on the or each lower element. Thus an even more efficient automation can be obtained.

Another special feature of the machine according to the invention consists in means provided for moving the upper and the lower rollers relatively to one another between a stand-by position, where they are close together so as to apply the said elements one on top of the other.

The plate provided with rectilinear elements is thus moved across the machine between at least two trains of rollers which may be applied automatically on each side of the elements or moved apart therefrom depending on the position of the elements with respect to the heating rollers and to the cooling device.

The invention will be better understood on reading the following description with reference to the accompanying drawings in which:

FIG. 1 is a top view of a heat exchanger,
FIG. 2 is a cross-sectional view along line II—II of FIG. 1,
FIG. 3 is an elevational side diagram, of a machine according to the invention,
FIG. 4 is a top view of the brazing solder depositing station and of the pre-assembling station of the machine shown in FIG. 3,
FIGS. 5,6 and 7 are cross-sectional views along lines V—V, VI—VI and VII—VII of FIG. 3,
FIG. 8 is a detailed view on an enlarged scale and in cross-section along line VIII—VIII of FIG. 5,
FIGS. 9 and 10 are detailed views on an enlarged scale of the heating and cooling rollers of the machine shown in FIG. 3, and
FIG. 11 is a diagram of a pneumatic control circuit for the heating and cooling stations of the machine shown in FIG. 3.

As already indicated, the field of application of the invention is, more generally, the soldering together of parallel rectilinear elements. By way of example and non-restrictively, the following description will consider the case of the soldering of rectilinear elements on a plate, for example to form a heat collector for solar energy collector systems.

FIGS. 1 and 2 illustrate a collector 1 comprising a plate 2 on which are soldered pipes 3 parallel each other. Said pipes 3 are joined by brazing, at one end, to a common feed pipe 4, and at the other end, to a common collector pipe 5. The pipes 4 and 5 are perpendicular to the tubes 3 and the assembly formed by pipes 3,4,5 is hereinafter designated as a ladder of pipes.

The plate 2 is hollowed in, by stamping for example, in order to form rectilinear imprints 6 with an arc-of-a-circle cross-section, and inside which are housed the pipes 3 and if necessary the pipes 4 and 5. The hollows 6 and the plate 2 have a curving radius which is adapted to that of the pipes housed therein.

The collector 1 is for example of the type used in solar energy collector systems for converting solar energy into heat released by a fluid flowing through the pipes.

The plate 2, and at least the pipes 3, are made of a metal which is a good heat conductor, such as copper.

The ladder of pipes is welded to the plate with the machine shown in FIG. 3.

This machine comprises successively a station 20 for applying the brazing solder, a station 30 where the elements to be soldered are pre-assembled, a heating station 40 and a cooling station 60.

The brazing solder depositing station comprises (FIGS. 3,4,5 and 8) a brazing solder tank 21, in which soaks the lower portion of a horizontal coating roller 22, and a pressing roller 23 parallel to the roller 22 and placed above the latter.

The level of the tank 21 is constant and said tank is provided with stirring means for keeping homogeneous the brazing solder contained therein. Said brazing solder is of a type known per se with incorporated flux and containing tin and it is in paste form or even virtually liquid at room temperature.

Vertical plates 26 are provided with vertical notches 25 forming bearings which support the shaft 22a of the roller 22.

The shaft 23a of the pressing roller 23 is guided horizontally in the notches 25 and is housed at its ends in apertures 24 provided at the ends of raising-up levers 27. Said levers are pivotally mounted on torsion bar or pipe 28 and permit to move the roller 23 between a high position of release and a low position of work (FIG. 8). During this movement the shaft 23a is guided in the notches 25 and moves between the ends of the apertures 24. means (not shown) may be provided to lock the raising levers in the released position.

Two discs 29 are placed on the shaft 22a on either side of the ends of the roller 22, outside the tank 21. Said discs 29 have a diameter slightly greater than that of the roller 22.

Downstream of station 20 is situated the pre-assembling station 30 where the elements coated with the brazing solder are positioned above the elements to be welded to them.

In the particular case considered, a plate 2 is pre-positioned at station 30 on supporting rollers 31 whose axis is perpendicular to the direction F of movement through the soldering machine followed by the elements to be welded.

The ladder of pipes is guided through stations 20 and 30 by two L-shaped sections 32. Said L-sections extend laterally over the whole length of stations 20 and 30, in parallel to the direction F.

At station 30, two openings 33, 34 are made in the carrying portion of each L-section 32. The distance between the said openings is equal to the distance separating the pipes 4 and 5 in a ladder of pipes. Flaps 35 are actuated by means of pull handles 36 to open or shut the openings 33 situated on the sides of the station 20.

The heating station 40 and the cooling station 60 are located downstream of the station 30 and are traversed by two endless chains 10 parallel to the direction F, provided with hooks 11 and each passing over a driving wheel 12, at least one intermediate wheel 13 and over supporting rollers (not shown). The chains 10 traverse successively the heating station 40 and the cooling station 60. Along the chains 10 are placed cams 14 passing in front of detectors 16a, 17a, 17b, 17b when said chains are moving.

The heating station (FIGS. 6 and 9) comprises a train of upper heating rollers 41, fast in rotation with a common shaft 42 adapted to rotate freely in bearings 43. Said latter are supported at the ends of vertical arms 49 fixed under a bar 45.

Said bar 45 is suspended by its ends to the frame of the machine by means of two jacks 44.

The vertical arms 49 are vertically elastic arms, consisting for example of two elements, fitting one inside the other with interposition of a spring.

A train of lower rollers 51 integral in rotation with a common shaft 52 is placed beneath the train of rollers 41. Said rollers 41 and 51 are situated on their side of the path followed by the chains 10 and the shafts 42, 52 are perpendicular to the direction F of movement of the chains 10.

The shaft 52 is supported by fixed bearings 53 at the ends of rigid vertical arms 59 carried by a bar 55. Said bar 55 is supported at its ends by the frame of the machine, by way of two jacks 54.

Each heating roller 41, 51 respectively, contains a series of electrical elements 46a, 56a connected in parallel on two electrical conductors housed in an axial bore of the shaft 42, 52. Each shaft 42, 52 carries at one end, annular collectors 46, 56 on which rub brushes 47, 57 connected to the terminals of a voltage source.

On its periphery, each heating roller 41, 51 has a profile adapted to that of the element to be welded and over which said roller rolls. In the particular case considered, which is that of welding pipes 3 in hollow parts of a plate 2, the rollers 41, 51 are provided with annular grooves 48, 58 respectively whose profiles are adapted to the curving radii of the pipes 3 and of the undulations of the plate 2 at the level of the hollows 6.

The cooling station 60 (FIGS. 7,10), comprises, similarly to the heating station 40, a train of upper rollers 61 and a train of lower rollers 71 situated on either side of the path followed by the chain 10.

The rollers 61, 71 are mounted on hollow shafts 62, 72 perpendicular to the direction F of movement of the chains 10.

The shaft 62 rotates in bearings 63 fixed to the ends of elastic vertical arms 69. Said arms are secured underneath a bar 65 suspended by its ends to the frame of the machine, by way of two jacks 64.

The shaft 72 rotates in bearings 73 secured to the ends of rigid vertical arms 79. Said latter are carried by a bar 75 supported at its ends by the frame of the machine, by way of two jacks 74.

Each cooling roller 61(71) is mounted on its tubular shaft 62 (72) with interposition of seals 66 (76). At the level of each roller, each shaft 62(72) is provided with orifices 67a (77a) and with orifices 67b (77b) on either side of a plug 67 (77) shutting off the inside of the shaft. Said orifices 67a, 67b, (77a, 77b), create a communication between the inside of the shaft, on either side of the plug 67 (77), and an annular chamber 61a (71a) formed inside the roller and around the shaft 62 (72).

Each tubular shaft 62, 72 is provided at its two ends with rotary joints 62a-62b, 72a-72b, connecting them in tight manner to pipes supplying and discharging a cooling fluid (water for example).

On their periphery and similarly to the rollers 41, 51, the rollers 61, 71 have profiles 68, 78 that are adapted to that of the elements over which they roll.

The machine described hereinabove, in its particular application to the soldering of a ladder of pipes 3,4,5 on a plate 2, operates as follows:

The levers 27 being in the released position, a ladder of pipes is introduced at the inlet to station 20. The levers 27 are lowered and the ladder of pipes is moved, by hand for example, in the direction F, the pipes 3 being parallel to the said direction. The ladder of pipes is guided by L-sections 32 on which rest the ends of the pipes 4 and 5 (FIG. 4).

The brazing solder is deposited in continuous manner on the lower part of each pipe 3 (FIG. 5) whereas the discs 29 prevent any deposit of brazing solder on the pipes 4 and 5 by pressing thereon.

The openings 33 being closed, the pipe ladder can progress in the direction F until that (4) of pipes 4 and 5 which is situated at the front arrives at the level of the open apertures 34 and ceases to be supported by the sections 32.

The flaps 35 are then opened, by hand for example, and the ladder of pipes 3,4,5 comes into position on a plate 2 pre-positioned on the rollers 31. The positions of the openings 33, 34 are such that the ladder of pipes fits precisely in the place provided on the plate 2. Guide-marks may be provided to allow the accurate positioning of the plate 2 on the rollers.

The ladder of pipes and the plate being pre-assembled with interposition of brazing solder, a driving bar is connected temporarily to that assembly, for example by being slipped in that (4) of pipes 4 and 5 which is situated at the front.

The chains 10 are stopped, the trains of rollers 41-5-1—as well as the trains of rollers 61-71—being set apart from one another by means of jacks 44, 64 which keep the shafts 42, 62 in a raised position and of jacks 54, 74 which keep the shafts 52, 72 in a down position.

By actuating a switch, the rollers are heated up to a predetermined temperature controlled by thermostat, and once this temperature is reached, the chains 10 are set in motion.

The hooks 11 come into engagement against the driving bar and cause the ladder of pipes-plate assembly to move forward. For safety's sake, the ladder of pipes and the plate can be clipped together so as to ensure the movement of the plate by the simple pulling action exercised on the driving bar.

The arrival of a plate 2 to the heating station is detected by the passage of a cam 14 before a detector 16a which sets into operation a control valve 81a. Said latter acts on a distributor 82 (FIG. 11) which controls the jacks 44 and 54 to bring closer together the upper and lower trains of heating rollers.

Said heating rollers are then applied on both sides of the plate 2, each roller 41 being brought against the end of a pipe 3, and each roller 51 being brought against the lower face of the plate 2, under a roller 41.

When the trains of rollers 41 and 51 start coming closer together, a switch 18 is actuated, to start off a timing device 19 which stops the chains 10 for a predetermined preheating period so as to ensure the melting of the brazing solder whilst taking into account the initial thermal inertia of the assembly to be welded.

This timing operation is repeated after each starting-up following a stop for any kind of reason, so as to ensure the necessary pre-heating.

At the end of the timing period, the chains 10 start moving again and when the cam 14 passes before a second pneumatic detector 17a which acts on a control valve 84a, the jacks 64, 74 are actuated by a distributor to apply the rollers 61, 71 on either side of the plate 2, in the same way as the rollers 41, 51.

The heating means provided inside the heating rollers make it possible to really produce a permanent heating where and when the soldering actually occurs.

The brazing solder is thus melted in continuous manner all along the pipes 3 and then solidified by flowing a cooling fluid (water) through the tubular shafts 62, 72 and in the chambers 61a, 71a of the rollers 61, 71.

The contact force of the heating and cooling rollers is dependent on the height adjustment of end-of-travel stop means provided for the top movable bars 45, 65 so as to more or less compress the springs of the elastic arms 49, 69.

The speed of action of the jacks is adjusted by controlling the passage cross section for the working fluid provided on each jack. Such control may be provided on the outlet or on the inlet of each jack.

When the cam 14 passes before the detector 16b, this acts on a control valve 81b, the distributor 82 is returned to its initial position and the trains of heating rollers 41, 51 are set apart.

It will be noted that the passage of the cam 14 in front of the detector 16b can set off a timing device before causing the heating rollers to return to their position apart from one another. Said timing operations enables to ensure a complete melting of the brazing solder in the vicinity of that (5) of the tubes 4 and 5 situated at the back of the ladder of pipes in the direction F.

When the cam 14 passes in front of the detector 17b said latter controls a valve 84b which acts on the distributor 83, and it is then the turn of the cooling rollers to be returned to their initial position.

One soldering operation is then completed. A special device may be provided to release automatically the hooks 11 from the driving bar before the return of the hooks 11 or the arrival of new hooks in the starting position.

The stopping of the chains 10 in the starting position may be controlled by means of an end-of-travel contactor 14a actuated by the cam 14 or by an identical following cam.

The positions of the cam 14, of the detectors 16a, 17a, 16b, 17b, are determined as a function of the size of the parts to be welded.

In particular, it is necessary to apply the rollers after the passage of the end pipe 4 (or 5) situated at the front, in the moving direction of the plate 2, and to retract them before the passage of the end pipe 5 (or 4) situated at the rear.

Although what is described hereinabove is a machine consisting of one station for depositing the brazing solder, of a pre-assembling station and of heating and cooling stations, it must be noted that as a variant, the machine according to the invention can be limited to the last two stations, the depositing of the brazing solder and the pre-assembling being effected by hand. In every case, the soldering proper is realized automatically.

It will be further noted that the machine according to the invention may be easily adapted to elements to be soldered of definite or undefinite lengths, and to different brazings at low melting temperature (below 400° C.). Indeed, it suffices then to adjust a few simple parameters such as for example the temperature of the heating rollers and the running speed. Moreover, the machine offers the possibility of soldering simultaneously a variable number of parallel elements, and even a large number thereof.

The machine can further be used for soldering elements of different thicknesses and shapes.

Finally it is important to note that a reliable and easy to maintain machine is obtained because of the very low number of parts in relative movement.

Various modifications and additions may of course be brought to the embodiment described hereinabove of the machine according to the invention without for all that departing from its scope of protection such as it is defined in the accompanying claims.

For example the brazing solder may be deposited automatically or not on all the elements to be soldered and not on part of them only.

What is claimed is:

1. A soldering machine for soldering continuously metallic, rectilinear and parallel elements, comprising:
   a driving device to move forward the elements to be soldered, which elements are disposed in parallel to the forward direction with at least one lower element, at least one higher element disposed on top of the lower element, and one layer of brazing solder interposed between the said elements in the area provided for the soldering,
   a heating station comprising upper and lower heating rollers with incorporated heating means, which rollers, as the elements move forward, respectively roll under the or each lower element and over the or each upper element in the soldering area, and a cooling station located downstream of the heating station and comprising lower and upper cooling rollers, which rollers, as the elements move forward, roll respectively under the or each lower element or over the or each upper element, to solidify the solder and to hold the said elements in close contact one against the other whilst they go through the cooling station.

2. A soldering machine as claimed in claim 1, wherein a station for depositing the brazing solder is situated upstream of the heating station.

3. A soldering machine as claimed in claim 2, wherein the station for depositing the brazing solder comprises at least a coating roller dipping into a tank containing the brazing solder with incorporated flux, and on which roller can pass at least the or each upper element in order to apply the brazing solder continuously.

4. A soldering machine as claimed in claim 2, wherein a station for pre-assembling the or each lower element with the or each upper element is provided between the brazing solder depositing station and the heating station.

5. A soldering machine as claimed in claim 1, wherein the cooling rollers are mounted on a common hollow axis connected to a circuit of cooling fluid.

6. A soldering machine as claimed in claim 1, wherein electrical elements are fitted in the said heating rollers in order to generate heat where and when the welding actually takes place.

7. A soldering machine as claimed in claim 1, wherein the driving device comprises an endless conveyor carrying individual members for driving each assembly of elements to be soldered.

8. A soldering machine as claimed in claim 1, further comprising means for moving the upper and lower heating and cooling rollers with respect to one another between a stand-by position, in which they are apart, and a working position, in which they are brought close together in order to apply the said elements one against the other.

9. A soldering machine as claimed in claim 8, further comprising means for detecting the position of an element transported by the said driving device and control means for automatically moving the upper and lower rollers with respect to one another depending on the position of the said element detected by the said detector means.

10. A soldering machine as claimed in claim 1, comprising at least a lower and an upper train of heating rollers, and a lower and an upper train of cooling rollers, the rollers in each train having a common axis perpendicular to the forward direction followed by the elements.

11. A soldering machine as claimed in claim 1, wherein said lower and upper elements consist respectively of a metal plate and of metal pipes for making a solar energy collector system having said pipes extending parallel to each other and welded on said metal plate.

* * * * *